United States Patent
Sawyer

(10) Patent No.: US 6,569,549 B1
(45) Date of Patent: May 27, 2003

(54) METHOD FOR INCREASING THE OPERATIONAL EFFICIENCY OF A FUEL CELL POWER PLANT

(75) Inventor: Richard D. Sawyer, Groveton, NH (US)

(73) Assignee: UTC Fuel Cells, LLC, South Windsor, CT (US)

( * ) Notice: Subject to any disclaimer, the term of this patent is extended or adjusted under 35 U.S.C. 154(b) by 88 days.

(21) Appl. No.: 09/704,891

(22) Filed: Nov. 2, 2000

(51) Int. Cl.[7] ................................................. H01M 8/00
(52) U.S. Cl. ............................ 429/13; 429/17; 429/18; 429/22; 429/24; 429/25
(58) Field of Search ............................ 429/13, 17, 18, 429/22, 24, 25

(56) References Cited

U.S. PATENT DOCUMENTS 4,769,297 A     9/1988   Reiser et al. ................. 429/17
4,963,443 A  * 10/1990   Kamoshita ................... 429/17
5,064,732 A    11/1991   Meyer .......................... 429/13
5,503,944 A     4/1996   Meyer et al. ................. 429/13
5,700,595 A    12/1997   Reiser ......................... 429/13
5,885,727 A  *  3/1999   Kawatsu ....................... 429/17

* cited by examiner

*Primary Examiner*—Laura Weiner
(74) *Attorney, Agent, or Firm*—McCormick, Paulding & Huber LLP

(57) ABSTRACT

A method is proposed for increasing the operational efficiency of a fuel cell power plant including a cell stack assembly comprised of a plurality of fuel cells in electrical communication with one another. The cell stack assembly includes a fuel inlet manifold and a fuel exhaust manifold for accepting and exhausting, respectively, a reactant fuel stream. The proposed method includes providing the cell stack assembly with the reactant fuel stream, sealing the fuel exhaust manifold for a first predetermined time period, thereby preventing the reactant fuel stream from exiting the cell stack assembly and opening the fuel exhaust manifold for a second predetermined time period.

21 Claims, 5 Drawing Sheets

METHOD FOR INCREASING THE OPERATIONAL EFFICIENCY OF A FUEL CELL POWER PLANT

FIELD OF THE INVENTION

This invention relates in general to a method for increasing the operational efficiency of a fuel cell power plant, and deals more particularly with a method of providing a fuel cell power plant with a reactant stream which increases the utilization of the reactant stream, thereby increasing the performance of the fuel cell power plant as a whole.

BACKGROUND OF THE INVENTION

Electrochemical fuel cell assemblies are known for their ability to produce electricity and a subsequent reaction product through the interaction of a reactant fuel being provided to an anode electrode and a reactant oxidant being provided to a cathode electrode, generating an external current flow therebetween. Such fuel cell assemblies are very useful due to their high efficiency, as compared to internal combustion fuel systems and the like, and may be applied in many fields. Fuel cell assemblies are additionally advantageous due to the environmentally friendly chemical reaction by-products, typically water, which are produced during their operation. Owing to these characteristics, amongst others, fuel cell assemblies are particularly applicable in those fields requiring highly reliable, stand-alone power generation, such as is required in space vehicles and mobile units including generators and motorized vehicles.

Typically, electrochemical fuel cell assemblies employ a hydrogen-rich gas stream as a fuel and an oxygen-rich gas stream as an oxidant, whereby the resultant reaction by-product is water. Such fuel cell assemblies may employ a membrane consisting of a solid polymer electrolyte, or ion exchange membrane, disposed between the anode and cathode electrodes formed of porous, electrically conductive sheet material—typically, carbon fiber paper. One particular type of ion exchange membrane is known as a proton exchange membrane (hereinafter PEM), such as sold by DuPont under the trade name NAFION™ and well known in the art. Catalyst layers are formed between the PEM and each electrode to promote the desired electrochemical reaction. The catalyst layer in a fuel cell assembly is typically a carbon supported platinum or platinum alloy, although other noble metals or noble metal alloys may be utilized. In order to control the temperature within the fuel cell assembly, a water coolant is typically provided to circulate about the fuel cell assembly.

In the typical operation of a PEM fuel cell assembly, a hydrogen rich fuel permeates the porous electrode material of the anode and reacts with the catalyst layer to form hydrogen ions and electrons. The hydrogen ions migrate through the PEM to the cathode electrode while the electrons flow through an external circuit connected to a load. At the cathode electrode, the oxygen-containing gas supply also permeates through the porous substrate material and reacts with the hydrogen ions and the electrons from the anode electrode at the catalyst layer to form the by-product water. Not only does the PEM facilitate the migration of these hydrogen ions from the anode to the cathode, but the ion exchange membrane also acts to isolate the hydrogen rich fuel from the oxygencontaining gas oxidant. The reactions taking place at the anode and cathode catalyst layers may be represented by the following equations:

Anode reaction $H_2 \rightarrow 2H^+ + 2e$

Cathode reaction: $1/2O_2 + 2H^+ + 2e \rightarrow H_2O$

In practical applications, a plurality of planar fuel cell assemblies are typically arranged in a stack, commonly referred to as a cell stack assembly. The cell stack assembly may be surrounded by an electrically insulating housing that defines the various manifolds necessary for directing the flow of a hydrogen-rich fuel and an oxygen-rich oxidant to the individual fuel cell assemblies, as well as a coolant stream, in a manner well known in the art. A fuel cell power plant may typically be comprised of the fuel cell stack assembly, reactant storage vessels, reactant control valves, reactant propulsion devices, coolant pumps, heat exchangers, coolant degassifiers or demineralizers, sensors for measuring reactant concentrations, temperatures, pressures, current, voltage, and a microprocessor that controls the operation of the fuel cell power plant.

As will be appreciated by one so skilled in the art, tying these differing components into a cohesive fuel cell power plant operating within specific design parameters results in a complex and oftentimes cumbersome structure.

Specifically, the operating efficiency of a fuel cell power plant is directly related to the utilization of the reactant fuel stream supplied to the fuel cell assemblies making up the fuel cell power plant. This utilization, commonly referred to as 'hydrogen utilization', due to the use of a hydrogen-rich fuel stream in PEM fuel cells, is the ratio of reactant fuel consumed at the anode electrode of the fuel cells, divided by the total quantity of reactant fuel supplied to the fuel cells multiplied by 100. While PEM fuel cell power plants are designed to come as close as possible to 100% utilization, this is practically unfeasible.

Current generation PEM fuel cells frequently use thin polymer membranes on the order of approximately 15 microns thick to maximize cell performance of approximately 1000 amps per square foot (ASF). A certain measure of the hydrogen utilized as fuel within these fuel cells will diffuse across this thin membrane from the anode electrode to the cathode electrode to react with the oxygen-rich oxidant to form water. Likewise, oxygen also tends to diffuse across this thin membrane to combine with hydrogen to form water.

The combination of these effects is to reduce the available hydrogen capable of reacting at the anode electrode of the fuel cells and hence, reduces the utilization rate of the fuel cell power plant as a whole.

It is common for PEM fuel cell power plants to be operated by supplying a reactant fuel to the integrated cell stack assembly using a cascade or multiple-pass approach, wherein the individual fuel cells in the cell stack assembly are separated in two or more groups. The reactant fuel is supplied to the first group of fuel cells and then cascades to the next group and so on until exiting the cell stack assembly through a fuel exit manifold. With such an arrangement, the practical hydrogen utilization has been found to be as high as 90% or more for the overall cell stack assembly, with individual cascade groups operating at approximately 60–70% utilization. Many different flow orientations have, however, been utilized in fuel cells. The objective is always to distribute the hydrogen flow such that every section of the fuel cell receives the required quantity of fuel. Flow configurations that have been used within the cell are single pass, two pass, multi-passes, serpentine and interdigitated. Other times an external recycle is used between the cell exit and the cell inlet to improve flow uniformity within the cell stack assembly.

It has been observed, however, that in certain circumstances, for instance during shutdown or startup of the PEM fuel cell power plant, some cascade groups may suffer from fuel starvation to such an extent that the fuel cell power plant is unable to achieve a desired power output. The fuel starvation is typically caused by the latter cascade groups being momentarily deprived of the fuel stream while it is cascading from the first cascade group to the last. In addition, fuel starvation may also occur during ongoing operation of the fuel cell power plant due to nitrogen contamination of the fuel stream, this nitrogen is typically present in the reactant oxidant stream that is also being supplied to the cell stack assembly. In many applications the oxidant stream is comprised of atmospheric oxygen which contains a nitrogen component that diffuses, in part, through the solid polymer PEM to dilute the hydrogen-rich fuel stream. The diluted hydrogen fuel stream may therefore not contain an adequate hydrogen concentration to support the required current density in some sections of the cell stack assembly, thereby corroding the anode electrode in some of the fuel cell assemblies and possibly leading to catastrophic damage.

It has previously been proposed to eliminate the cascade architecture in favor of a single-pass arrangement wherein each fuel cell in the cell stack assembly is provided with the reactant fuel stream via a common feed manifold while increasing the vent rate; however, this results in a lowering of the hydrogen utilization to approximately 80%, an unacceptably low efficiency rate for most applications. The phrase 'vent rate' as utilized above and hereinafter represents the rate at which the hydrogen fuel stream is exiting the anode electrode, that is, the anode flow fields, of a fuel cell, or cell stack assembly.

It has also been known to address the concern over impurities in both the reactant fuel and oxidant streams by totally purging the reactant flow chambers of a cell stack assembly, as practiced by the Assignee of the present invention in conjunction with cell stack assemblies provided to NASA for the space shuttle program. It will be readily appreciated that the complete purging of both the fuel and oxidant reactant streams is economically unadvantageous and therefore inappropriate when dealing with cell stack assemblies utilizing an oxidant reactant comprised of an non-pure oxygen stream in contact with a relatively thin PEM, as opposed to the pure oxygen stream and comparatively large PEM utilized with the cell stack assemblies manufactured for NASA shuttle program and the like.

With the forgoing problems and concerns in mind, the present invention therefore seeks to increase the hydrogen utilization for a PEM fuel cell power plant while simultaneously preventing fuel cell starvation and excessive dilution of the reactant fuel stream.

SUMMARY OF THE INVENTION

It is an object of the present invention to increase the operational efficiency of a fuel cell power plant.

It is another object of the present invention to increase the hydrogen utilization of a fuel cell power plant.

It is another object of the present invention to increase the hydrogen utilization of a fuel cell power plant while eliminating fuel cell starvation.

It is another object of the present invention to increase the hydrogen utilization of a fuel cell power plant while reducing the dilution of the reactant fuel stream.

According to one embodiment of the present invention, a method is proposed for increasing the operational efficiency of a fuel cell power plant including a cell stack assembly comprised of a plurality of fuel cells in electrical communication with one another. The cell stack assembly includes a fuel inlet manifold and a fuel exit manifold for accepting and exhausting, respectively, a reactant fuel stream. The proposed method includes providing the cell stack assembly with the reactant fuel stream, sealing the fuel exhaust manifold for a first predetermined time period, thereby preventing the reactant fuel stream from exiting the cell stack assembly and opening the fuel exhaust manifold for a second predetermined time period.

These and other objectives of the present invention, and their preferred embodiments, shall become clear by consideration of the specification, claims and drawings taken as a whole.

DETAILED DESCRIPTION OF THE PREFERRED EMBODIMENT

The present invention is generally directed towards increasing the operational efficiency of a PEM fuel cell power plant, wherein the reactant fuel stream provided to the power plant is typically a 'pure' gaseous stream of hydrogen, $H_2$. It will be readily appreciated that the fuel cell power plant of the present invention is comprised of those components necessary to enable operation of, and electrical generation from, the fuel cell power plant, including but not limited to: a cell stack assembly comprising a plurality of electrically integrated planar PEM fuel cells; reactant feed and exit manifolds for directing the reactant fuel and oxidant streams to and from the cell stack assembly; coolant channels or plates for circulating a coolant about the fuel cells during operation; various conduits, valves and contamination removal devices for controlling and cleansing the flow of reactants and coolants; and an integrated control system for monitoring the reactant flow rates and operating temperature of the fuel cell power plant so as to effectuate changes in these and other parameters, thereby maintaining the fuel cell power plant at approximately optimal operating conditions. It should also be noted that while the present invention is directed towards PEM fuel cell power plants utilizing pure $H_2$ fuel, the present invention is not limited in this regard as the method and apparatus hereinafter disclosed is equally applicable to non-PEM fuel cells.

When supplying fuel cells in a cell stack assembly with a pure $H_2$ fuel stream, it is desirable to utilize approximately 90% or more of the hydrogen fuel stream supplied to the fuel cells; that is, it is desirable to operate the cell stack assembly as a whole at approximately 90% or more utilization. It has heretofore been known to supply a cell stack assembly with a reactant fuel stream utilizing either a cascaded, multiple-pass system or a single-pass system, wherein the reactant fuel stream in either system is provided to the cell stack assembly at continuous, yet variable, vent rates. These systems, however, periodically suffer from the debilitating effects of reactant fuel starvation or dilution, as well as having unacceptable levels of hydrogen utilization. In PEM fuel cells, it is not uncommon for the reactant fuel stream to be diluted by nitrogen diffusing across the ion exchange membrane, typically a NAFION™ membrane or the like.

Figure 1:
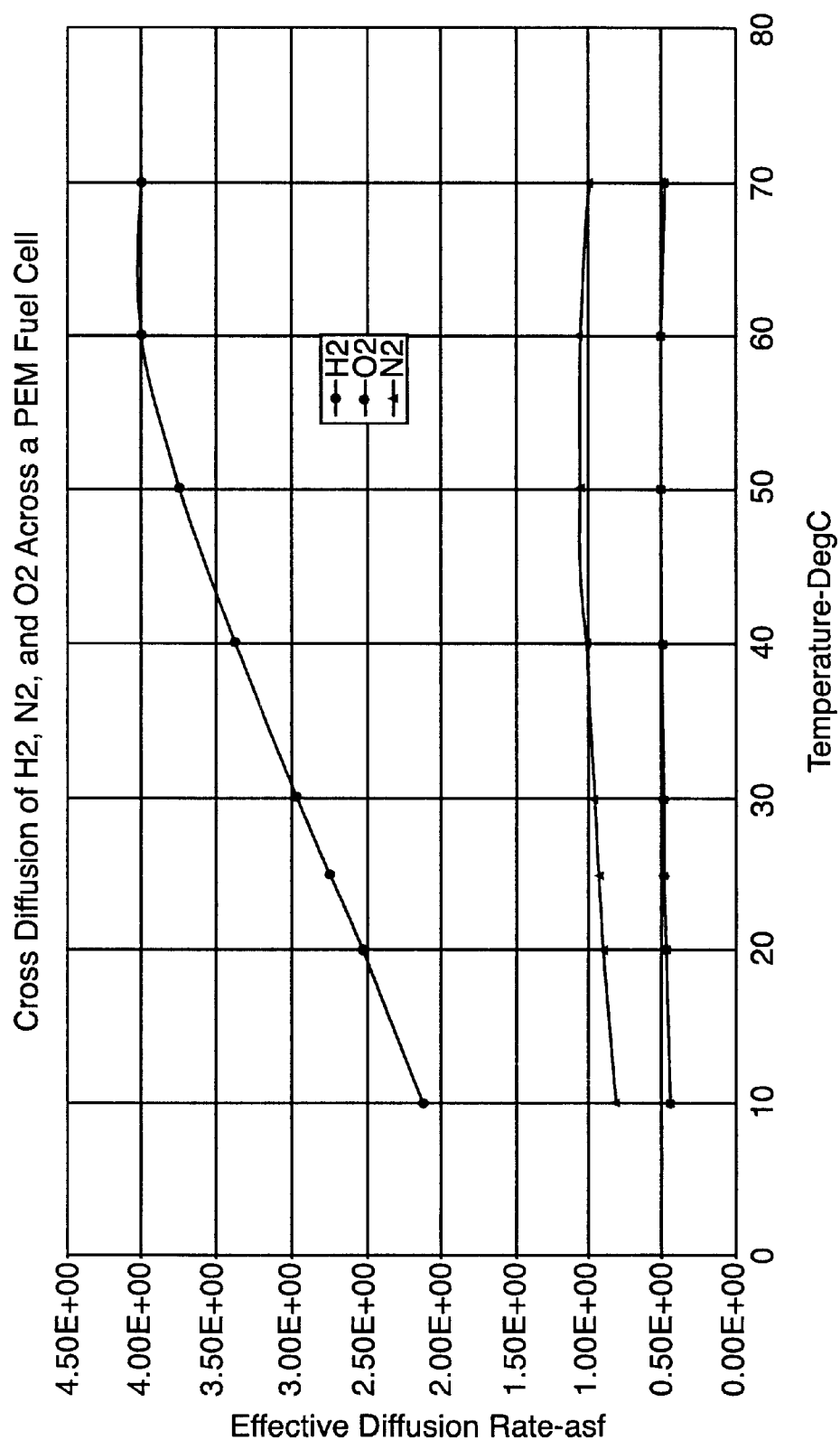
FIG. 1 is a graph illustrating typical diffusion rates of reactants and contaminants crossing the ion exchange membrane in a PEM fuel cell.

FIG. 1 illustrates the cross diffusion of nitrogen, $N_2$, during operation of a typical PEM cell stack assembly as compared to $H_2$ and oxygen, $O_2$, as equivalent current density generating reactants; that is, in relation to an equivalent amount of current which would be produced by the cell stack assembly by a similar volume of $H_2$. FIG. 1 depicts a 0.4 square foot fuel cell containing a 15 micron thick proton exchange membrane supplied by the W. L. Gore Co., of Elkton, Md., for reactant pressures of approximately one atmosphere. As shown in FIG. 1, the cross diffusion of $N_2$ is seen to peak at approximately 60° C. as the increase in water vapor in the cell stack assembly due to increasing temperatures, corresponding to a decrease in the partial pressure of $N_2$ within the cell stack assembly, is larger than the increase in $N_2$ permeability. It should be noted that the graph of FIG. 1 illustrates the cross diffusion of $N_2$ utilizing the known method of providing the cell stack assembly with a reactant fuel having a constant vent rate.

Figure 2:
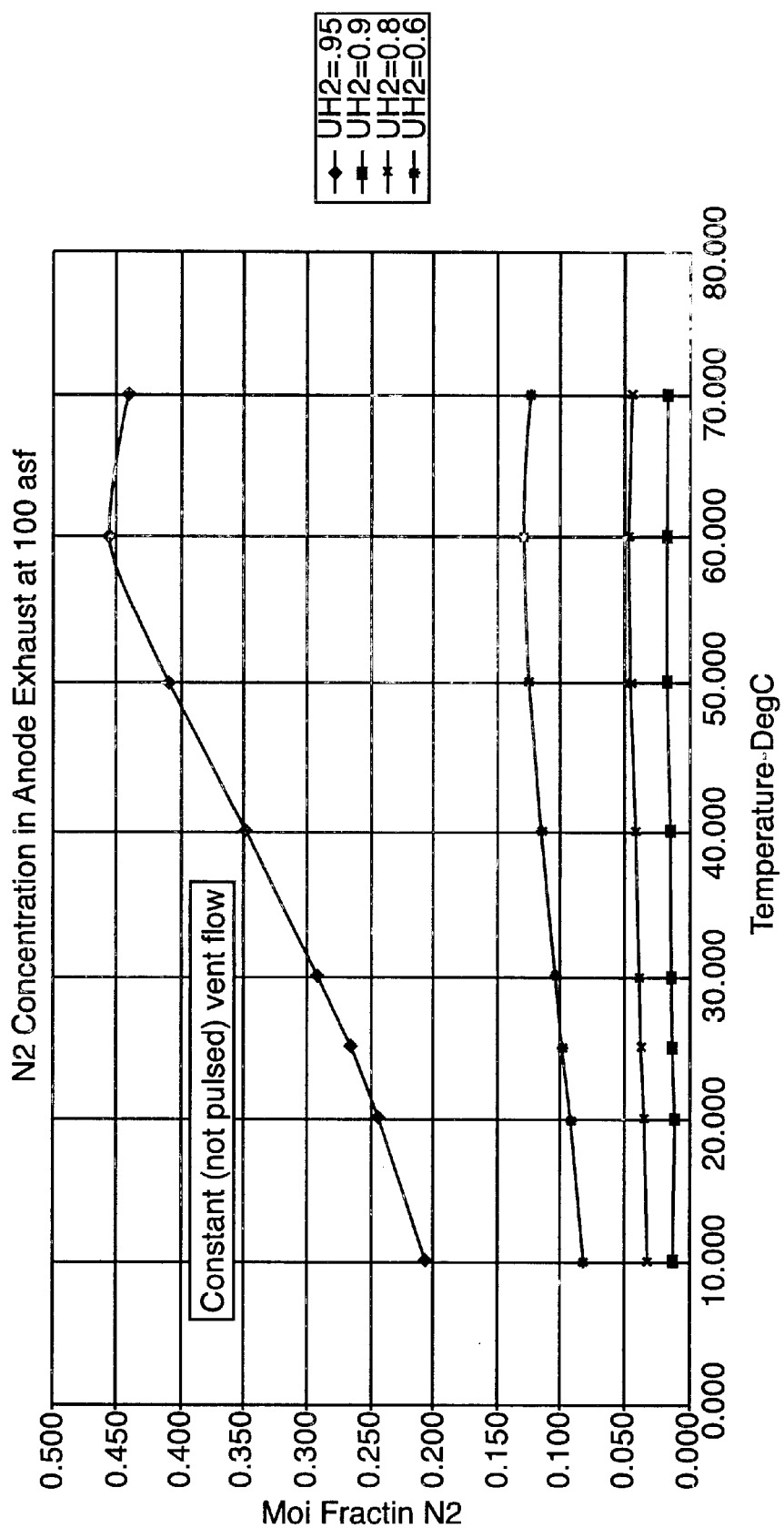
FIG. 2 is a graph illustrating nitrogen concentrations in a PEM fuel cell at various temperatures and hydrogen utilization rates.

FIG. 2 illustrates the $N_2$ concentration that results from operating at various temperatures and hydrogen utilizations at 100 amps per square foot. The nitrogen mole fraction at the exhaust of the anode flow field is approximately 45% at a hydrogen utilization of 95% at temperatures of 60 to 70° C.

The present invention therefore seeks to reduce the effect of the cross diffusion of $N_2$, depicted by way of example in FIG. 1, to an acceptable level while also increasing the hydrogen utilization of a cell stack assembly of a fuel cell power plant. To achieve these objectives, the present invention proposes to provide a cell stack assembly with a reactant fuel stream utilizing a discrete venting rate; that is, the present invention will provide a reactant fuel stream to a cell stack assembly utilizing a purge-pulse method, rather than the constant vent rate method presently employed in most known systems.

It has been discovered that by providing a fuel cell assembly with discrete pulses of reactant fuel, separated by periods of running the cell stack assembly 'dead-ended', it is possible to operate the cell stack assembly at high utilization rates while preserving acceptable fuel quality. The term 'dead-ended' as utilized above and hereinafter represents operating the cell stack assembly during periods in which the fuel exit manifolds are sealed.

Figure 3:
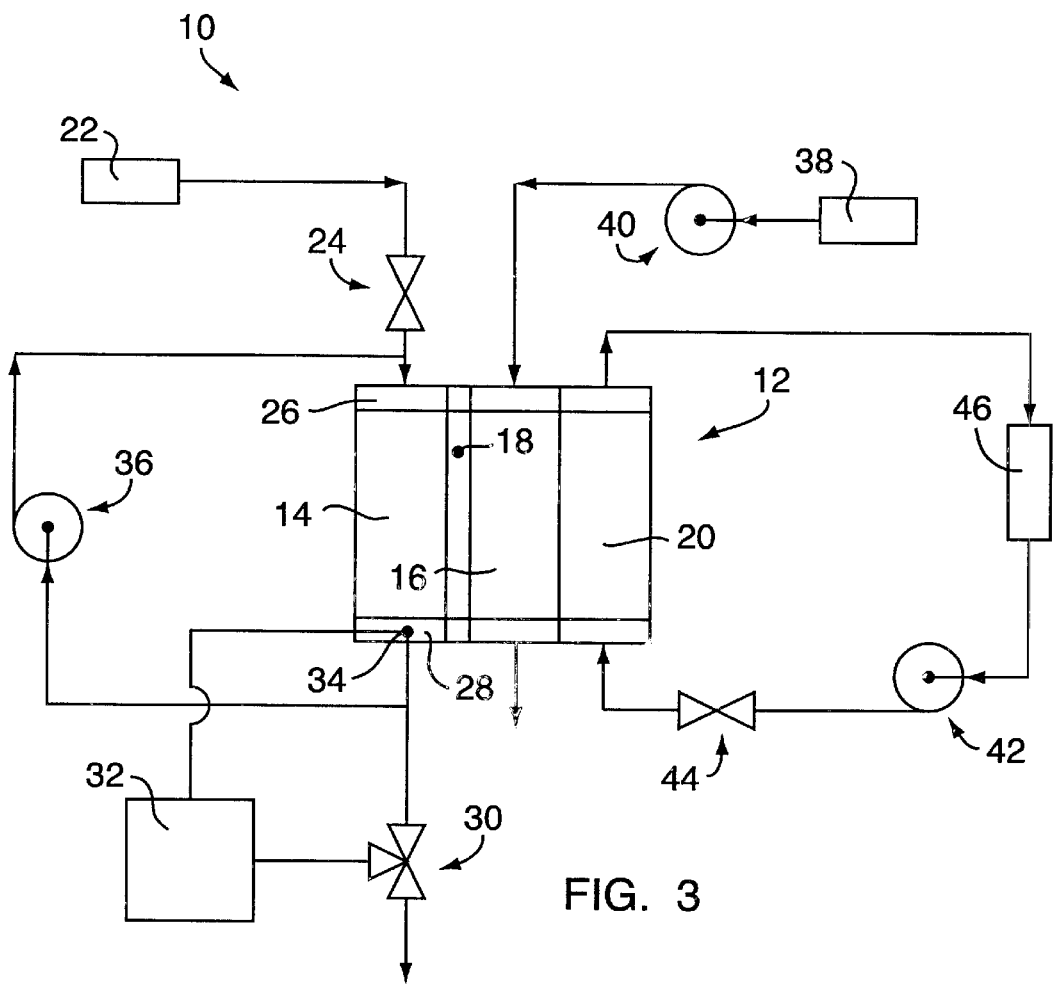
FIG. 3 is a schematic diagram illustrating a fuel cell power plant incorporating a reactant supply method according to one embodiment of the present invention.

FIG. 3 is a block diagram illustrating the basic elements of a fuel cell power plant 10 according to one embodiment of the present invention. The cell stack assembly 12 is shown as a single fuel cell assembly for clarity, however it will be appreciated that the fuel cell power plant 10 is typically comprised of a plurality of planar fuel cell assemblies in electrical communication with one another. As seen in FIG. 3, the cell stack assembly 12 includes an anode electrode 14, a cathode electrode 16, a PEM electrolyte 18 disposed therebetween and a coolant plate 20.

While the basic components and functions of the fuel cell power plant 10, and their ancillary devices, are sufficiently well known, the distinctive features of the fuel cell power plant 10 are related to the fuel flow control system and its mode of operation. According to the present invention, the fuel flow control system includes a pressurized hydrogen source 22, a fuel pressure regulator 24, a fuel inlet manifold 26, an anode flow field integrated into the anode side 14, a fuel exit manifold 28, a fuel exhaust vent valve 30, a vent valve controller 32 and, optionally, a gas concentration sensor 34 located within the cell stack assembly 12. The valve vent controller may be configured to operate on a timed schedule, an average time multiplied by the current load schedule on the fuel cell power plant 10 or in relation to the nitrogen concentration schedule as detected by the sensor 34. The fuel cell power plant may also include a fuel recycle loop and blower 36. An oxidant source 38 is introduced to the fuel cell stack 12 by an oxidant blower 40, or the like, while a coolant pump 42 and a coolant pressure valve 44 serve to circulate coolant through a heat exchanger 46 of the coolant loop in communication with the coolant plate 20.

After running the cell stack assembly 12 of the present invention deadended for a predetermined period of time, $N_2$ will begin to concentrate in the vicinity of the anode flow field exits, as well as in the exit manifold 34 of the cell stack assembly 12. All that is necessary for optimal operation, therefore, is to ensure that each successive pulse of reactant fuel which is provided to the cell stack assembly 12 during those periods of time which the cell stack assembly is not operated dead-ended, is of sufficient volume to purge the entirety of all of the anode electrode flow fields and the exit manifold 34.

It is important to maintain the average nitrogen concentration of the reactant fuel stream to levels approximately equal to 25% in volume, so as to avoid debilitating starvation of individual fuel cells in the cell stack assembly. It is also important to maintain the exit nitrogen concentration at the exit of the anode flow field to less than 75% in volume for the same reasons. For a typical cell stack assembly it has been shown that the cell stack assembly may be operated dead-ended for approximately 20 seconds or more without exceeding an average nitrogen contamination of 25%.

Figure 4:
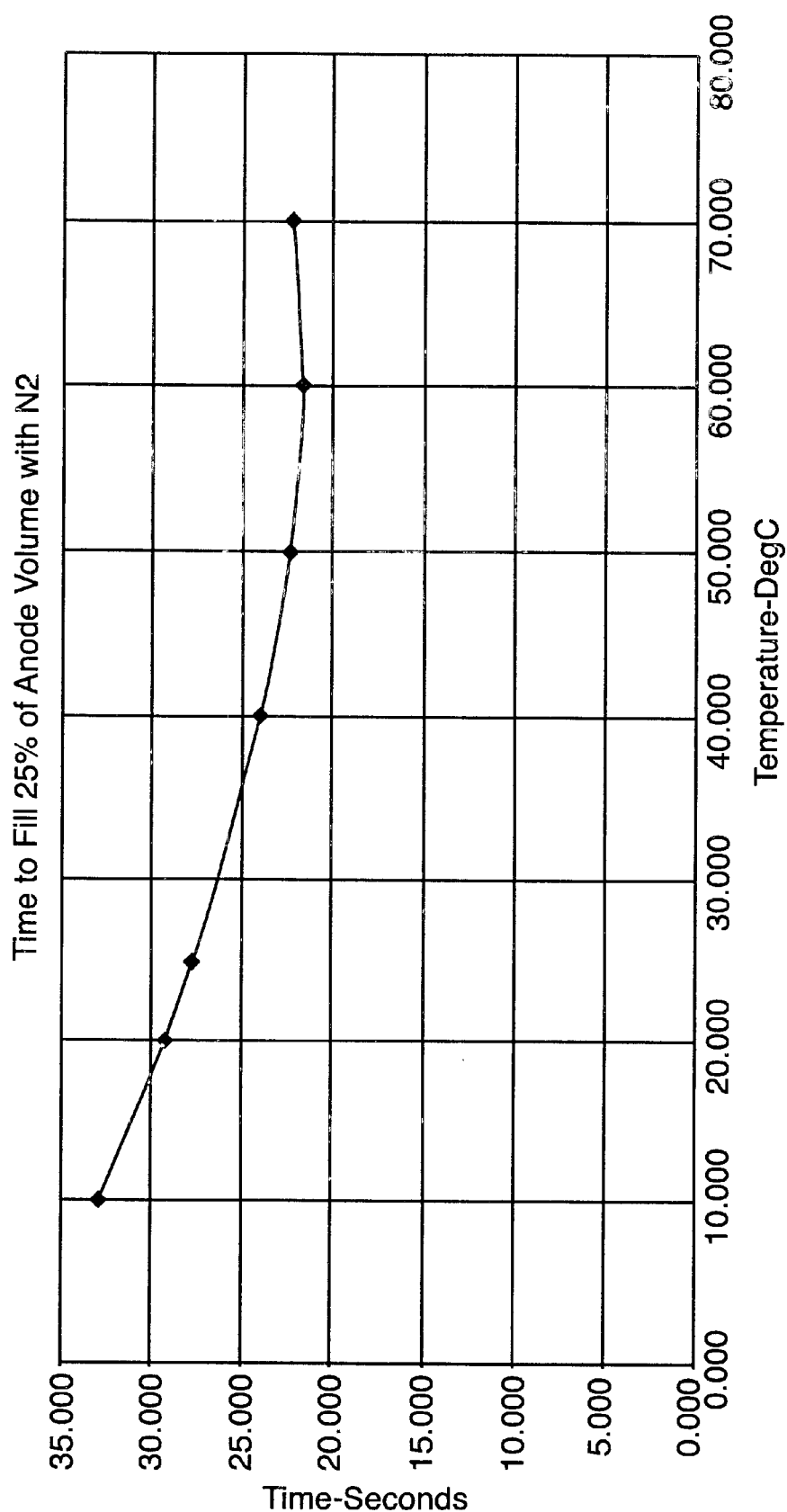
FIG. 4 is a graph illustrating approximate rates at which nitrogen contaminates the reactant fuel stream in a PEM fuel cell, such as is utilized in the fuel cell power plant of FIG. 3.
Figure 5:
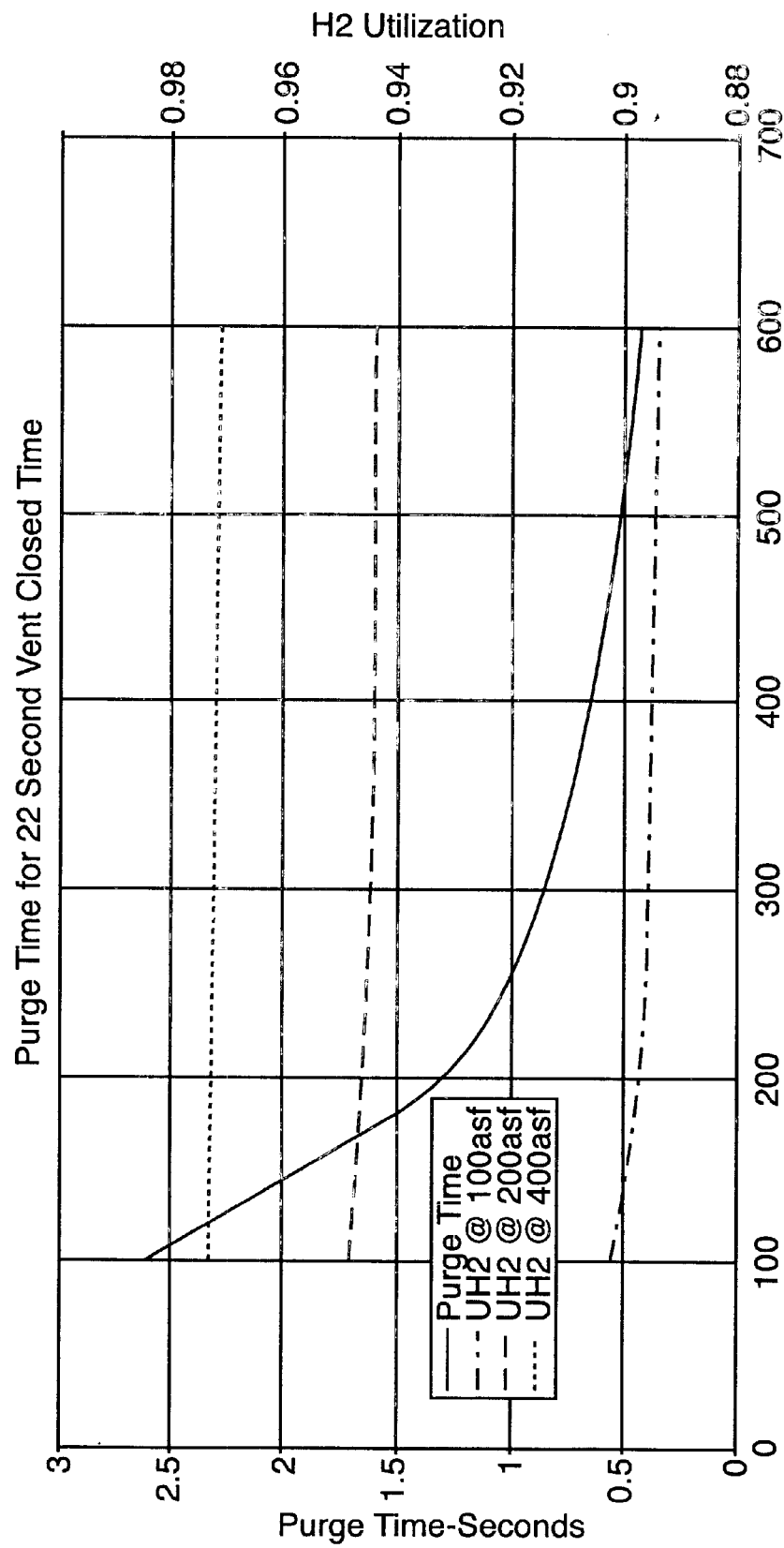
FIG. 5 is a graph illustrating the interrelationship between hydrogen utilization, purge time and venting rate, according to one embodiment of the present invention.

FIGS. 4 and 5 that follow are based on fuel cell assemblies operating with a 15 micron thick Gore™ PEM operating at approximately atmospheric pressure. The diffusion rate of nitrogen across the PEM will be dependant upon the specific fuel cell assembly design, the critical parameters including the thickness of the PEM, the operating temperature of the fuel cell power plant as a whole and the operating pressure. Likewise, the time or the purge interval will be set by criteria including the nitrogen concentration at the exit of the anode flow fields, typically not more than approximately 75% in volume. In practice, the actual purge interval will be concretely established either experimentally or by analysis for the specific cell stack assembly design by techniques ascertainable to those so skilled in the art. As noted previously, the purge volume is set to be equal to the total open volume of the anode flow fields and the fuel reactant manifold 28.

FIG. 4 depicts the observed time period within which 25% of the anode exhaust/fuel exit manifold volume will be filled with $N_2$, at differing operating temperatures. It will be readily appreciated that while a time period of approximately 20 seconds has been described above, the present invention is not limited in this regard as alternative time periods may be substituted therefor in dependence upon the particular size, manufacture and operation of the cell stack assembly utilized.

While the graph depicted in FIG. 4 indicates that the preferred time period between purge pulses of the reactant fuel stream is approximately 22 seconds for a cell stack assembly operating at a relatively low power of approximately 100 asf, FIG. 5 illustrates the average hydrogen utilization as compared to the duration of the purge pulse at various operating current densities. As can be seen in FIG. 5, the effective utilization is largely independent of the venting rate of the cell stack assembly, wherein the total volume to be vented is assumed constant for all measurements in FIG. 5. As also evidenced by FIG. 5, the required purge pulse duration varies inversely with the venting rate of the cell stack assembly, wherein the highest utilization achievable when the cell stack assembly is operating at approximately 100 asf is approximately 90%, while a 95% or more utilization rate is achievable at approximately 200 asf and above.

As discussed previously, the term 'vent rate' is the rate at which a reactant fuel stream is exiting the anode flow field of a fuel cell, or cell stack assembly. In connection with FIG. 5, therefore, the 'equivalent vent rate' is a measure of the rate at which the reactant fuel stream is periodically pulsed through the cell stack assembly which, if flowed continually at this rate, would enable a maximum current density of a given amount, as noted. The 'equivalent vent rate' may also be referred to as the 'purge rate'. In this context, the required purge rate for any PEM cell stack assembly utilizing a pulse purge operating method as disclosed herein is equal to that rate which results in a maximum hydrogen utilization of approximately 80% at the highest operating load of the cell stack assembly. By way of example, for a cell stack assembly operating at a 600 asf maximum current density, the purge rate would be approximately equivalent to 150 asf $H_2$ consumption, applied for a duration of approximately 1.8 seconds.

Figure 6:
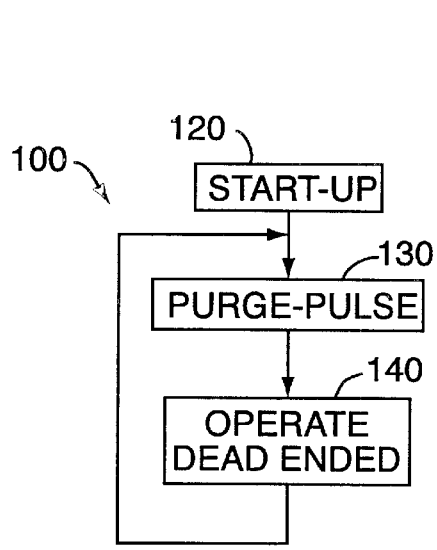
FIG. 6 is a flow diagram for operation of a PEM fuel cell power plant, according to one embodiment of the present invention.

FIG. 6 illustrates one mode of operation for the cell stack assembly 12 as part of the overall fuel cell power plant 10, according to one embodiment of the present invention. As depicted in FIG. 6, an operation cycle 100 begins when an operator either manually or automatically initiates a start-up procedure for the fuel cell power plant at step 120. A purge pulse is initiated in step 130 wherein a stream of preferably pure hydrogen gas, $H_2$, is provided to the cell stack assembly. As discussed above, the duration of this purge pulse is dependant upon the specific type of fuel cell power plant in use, as well as the purge rate of the purge pulse and current density at which the cell stack assembly of the fuel cell power plant is being operated. The purge time may therefore be between approximately 0.5 seconds to approximately 2.5 seconds for a typical cell stack assembly, as previously described.

Step 140 of the operation cycle 100 includes cutting off the purge pulse of $H_2$ by sealing the fuel exhaust vent valve 30 of the cell stack assembly 12 so that the cell stack assembly 12 may run dead-ended for a predetermined amount of time. The duration of the dead-ended operation in step 140, that is, the time period between successive purge pulses, may also be set according to the specific type of fuel cell power plant in use and the current density at which the cell stack assembly of the fuel cell power plant is being operated. For a typical PEM cell stack assembly the duration of dead-ended operation may be approximately 20 seconds. At the end of the dead-ended operational time period, the fuel exhaust vent valve 30 is opened and the operation cycle returns to step 130 to once again initiate a purge pulse, thereby infusing the cell stack assembly with a fresh $H_2$ fuel stream. It will be readily appreciated that each successive purge pulse will therefore vacate the largely expended $H_2$ fuel stream, which by then is typically contaminated with a measured amount of $N_2$, as discussed previously.

In accordance with the operation cycle 100 depicted in FIG. 6, a fuel cell power plant may therefore be operated on a set purge pulse schedule, thereby elevating the hydrogen utilization of the cell stack assembly to levels approximately above 95%, while ensuring that the reactant fuel stream does not become contaminated with debilitating quantities of $N_2$. The present invention, however, is not limited in this regard as it is possible to utilize an operation cycle in which feedback from the cell stack assembly 12 dynamically controls the duration of the dead-ended operation.

Figure 7:
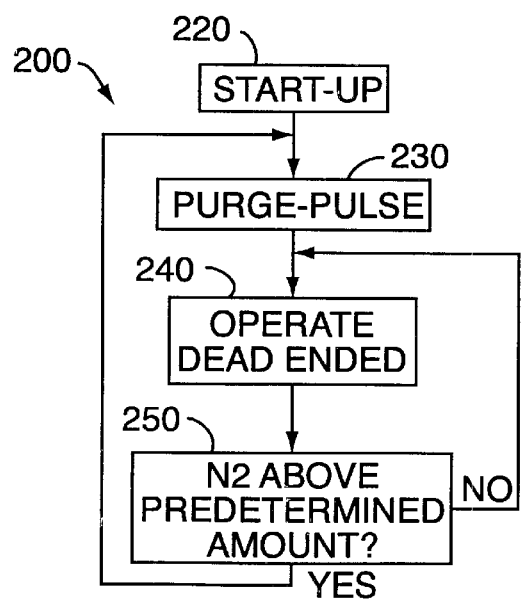
FIG. 7 is a flow diagram for operation of a PEM fuel cell power plant, according to another embodiment of the present invention.

As depicted in FIG. 7, an operation cycle 200 begins when an operator either manually or automatically initiates a start-up procedure for the fuel cell power plant 10 at step 220. A purge pulse is initiated in step 230 wherein a stream of preferably pure hydrogen gas, $H_2$, is provided to the cell stack assembly 12. As discussed above, the duration of this purge pulse is dependant upon the specific type of fuel cell power plant in use, as well as the purge rate of the purge pulse and current density at which the cell stack assembly of the fuel cell power plant is being operated. The purge time may therefore be between approximately 0.5 seconds to approximately 2.5 seconds for a typical PEM cell stack assembly.

Step 240 of the operation cycle 200 includes cutting off the purge pulse of $H_2$ by sealing the fuel exhaust vent valve 30 of the cell stack assembly 12 so that the cell stack assembly 12 may run dead-ended for a predetermined amount of time. In contrast to the embodiment depicted in FIG. 6, the dead-ended operation in step 240, that is, the time period between successive purge pulses, continues until unacceptable levels of $N_2$ are detected in the fuel exhaust manifold by the sensor 34, or the like.

Step 250 illustrates that portion of the operation cycle 200 which monitors the $N_2$ level within or adjacent to the fuel exit manifold 28 of the cell stack assembly 12. As discussed, the sensor 34 may be located within or adjacent to the fuel exit manifold 28 for detecting $N_2$ levels and communicating the detected levels to the controller 32. As long as the detected levels of $N_2$ remain below a predetermined level, the controller 32 will permits the operation cycle 200 to continue to run the fuel cell power plant 10 dead-ended. Detection of $N_2$ levels above the predetermined level will cause the fuel exhaust vent valve 30 to be opened while the operation cycle returns to step 230 to once again initiate a purge pulse, thereby infusing the cell stack assembly with a fresh $H_2$ fuel stream.

In accordance with the operation cycle 200 depicted in FIG. 7, a fuel cell power plant may therefore be operated on a dynamic purge pulse schedule, wherein variable durational periods of operating the fuel cell power plant dead-ended may be accommodated according to actual detected levels of $N_2$. The operation cycle 200 of FIG. 7 thereby elevates the hydrogen utilization of the cell stack assembly to levels approximately above 95%, while also ensuring that the reactant fuel stream does not become contaminated with debilitating quantities of $N_2$.

The operation cycles 100 and 200, of FIGS. 6 and 7 respectively, each utilize a non-cascaded, single pass delivery of reactant fuel to the cell stack assembly, thereby reducing the structural complexity of the fuel cell power plant as a whole. In this manner, fuel cell starvation may also effectively be avoided as the reactant fuel stream is provided to each of the fuel cells in the cell stack assembly at approximately the same concentrations. The present invention is not limited in this regard, however, as it is contemplated that those cell stack assemblies utilizing a multiple-pass, cascade approach in providing the reactant stream may also incorporate a similar fuel purge pulse architecture without departing from the broader aspects of the present invention.

As can be seen from the foregoing disclosure and figures in combination, the present invention utilizes a heretofore unknown reactant fuel delivery method wherein a fuel cell power plant is provided with discrete pulses of reactant fuel, thereby increasing hydrogen utilization and substantially decreasing the incidence of catastrophic failure of the fuel cell power plant due to fuel contamination or dilution. All of these attributes contribute to the efficient operation of a fuel cell power plant as a whole and are especially beneficial to those applications, such as motor vehicle propulsion, which demand high performance, reliability and energy efficiency.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A method for increasing the operational efficiency of a fuel cell power plant including a cell stack assembly comprised of a plurality of fuel cells in electrical communication with one another, said cell stack assembly including a fuel inlet manifold and a fuel exhaust manifold for accepting and exhausting, respectively, a reactant fuel stream, said method comprising the steps of:

providing said cell stack assembly with said reactant fuel stream;

sealing said fuel exhaust manifold for a first predetermined time period, thereby preventing said reactant fuel stream from exiting said cell stack assembly;

opening said fuel exhaust manifold for a second predetermined time period;

sensing a contaminant level in said reactant fuel stream; and determining a duration of said first and said second predetermined time periods in accordance with said sensed contaminant level.

2. The method for increasing the operational efficiency of a fuel cell power plant according to claim 1, said method further comprising the steps of:

pressurizing said reactant fuel stream; and utilizing a reactant fuel exhaust valve to seal said fuel exhaust manifold during said first predetermined time period.

3. The method for increasing the operational efficiency of a fuel cell power plant according to claim 2, said method further comprising the steps of:

utilizing a controller to control said duration of said first and said second predetermined time periods.

4. The method for increasing the operational efficiency of a fuel cell power plant according to claim 3, said method further comprising the steps of:

controlling said second predetermined time period to allow said reactant fuel stream to replace approximately an entire volume of said fuel exhaust manifold and anode flow fields of said cell stack assembly.

5. The method for increasing the operational efficiency of a fuel cell power plant according to claim 3, said method further comprising the steps of:

controlling said second predetermined time period to allow said reactant fuel stream to replace approximately an entire volume of said fuel exhaust manifold and said fuel inlet manifold of said cell stack assembly.

6. The method for increasing the operational efficiency of a fuel cell power plant according to claim 1, said method further comprising the steps of:

sensing a level of nitrogen contamination present in said fuel exit manifold.

7. The method for increasing the operational efficiency of a fuel cell power plant according to claim 1, said method further comprising the steps of:

controlling said first predetermined time period in dependence upon said contaminate level communicated to said controller.

8. The method for increasing the operational efficiency of a fuel cell power plant according to claim 1, said method further comprising the steps of:

controlling said first predetermined time period to end when said contaminant level present in said fuel exhaust manifold exceeds a predetermined value.

9. The method for increasing the operational efficiency of a fuel cell power plant according to claim 8, said method further comprising the steps of:

controlling said first predetermined time period to end when said contaminant level present in said fuel exhaust manifold exceeds 75% by volume.

10. The method for increasing the operational efficiency of a fuel cell power plant according to claim 8, said method further comprising the steps of:

controlling said first predetermined time period to end when a level of nitrogen present in said fuel exhaust manifold exceeds 75% by volume.

11. The method for increasing the operational efficiency of a fuel cell power plant according to claim 8, said method further comprising the steps of:

controlling said first predetermined time period to end when said contaminant level present in an anode flow field of said fuel cell assembly exceeds 75% by volume.

12. The method for increasing the operational efficiency of a fuel cell power plant according to claim 8, said method further comprising the steps of:

controlling said first predetermined time period to end when a level of nitrogen present in an anode flow field of said fuel cell assembly exceeds 75% by volume.

13. The method for increasing the operational efficiency of a fuel cell power plant according to claim 1, said method further comprising the steps of:

formulating said reactant fuel stream to be a hydrogen-rich gaseous stream.

14. The method for increasing the operational efficiency of a fuel cell power plant according to claim 1, said method further comprising the steps of:

formulating said reactant fuel stream to be hydrogen gas.

15. A fuel cell power plant, comprising:

a cell stack assembly having a plurality of planar fuel cells in electrical communication with one another, said fuel cells including a proton exchange membrane;

a fuel inlet manifold in gaseous communication with an anode flow field of said fuel cells, said fuel inlet manifold accepting a pressurized supply of reactant fuel comprised of a hydrogen-rich gaseous stream;

a fuel exhaust manifold in gaseous communication with an exhaust side of said anode flow field, said fuel exhaust manifold including an exhaust valve for selectively permitting said reactant fuel to exit said fuel exhaust manifold; and a controller for operating said exhaust valve, wherein said controller selectively commands said exhaust valve to alternate between an open position and a closed position during ongoing operation of said fuel cell power plant.

16. A fuel cell power plant according to claim 15, wherein:

said controller commands said fuel exhaust manifold to remain closed for a predetermined period of time.

17. A fuel cell power plant according to claim 15, wherein:

said cell stack assembly includes a sensor for detecting a contaminant level in said reactant fuel, said sensor being in data communication with said controller.

18. A fuel cell power plant according to claim 17, wherein:

said controller commands said fuel exhaust-manifold to remain closed until said contaminant level in said reactant fuel stream exceeds a predetermined level.

19. A fuel cell power plant according to claim 18, wherein:

said contaminant level is a level of nitrogen present in said anode flow field adjacent said fuel exhaust manifold.

20. A fuel cell power plant according to claim 19, wherein:

said contaminant level is a level of nitrogen present in said fuel exhaust manifold.

21. A fuel cell power plant according to claim 19, wherein:

said predetermined level is approximately 75% by volume of said reactant fuel stream.

* * * * *